Patented Oct. 18, 1949

2,484,843

UNITED STATES PATENT OFFICE 2,484,843

LUBRICANT COMPOSITION

John M. Musselman, South Euclid, Ohio, assignor to The Standard Oil Company, Cleveland, Ohio, a corporation of Ohio No Drawing. Application September 12, 1944, Serial No. 553,803

11 Claims. (Cl. 252—32.7)

This invention relates to lubricants and lubricating oil additives suited for uses under various conditions, including high pressures or high temperatures or both, as for example, use in an internal combustion engine operating at higher temperatures and in which the lubricant is in close contact with metal surfaces. Lubricating oils, particularly when used under these conditions, are subject to break-down due to sludge and acid formation.

It is an object of the invention to provide a new composition suitable for use as a lubricant and also as an agent for addition to lubricating oils and greases to inhibit sludge and acid formation and other forms of deterioration under operating conditions.

Another object of the invention is to provide a composition which can be made from materials not heretofore utilized in the manufacture of compositions of this general nature, and which result in improved yields of compositions having enhanced inhibition properties.

Various other objects and advantages of the invention will be apparent as it is disclosed more fully hereinafter.

In accordance with the present invention, I have found that hydrogenated waxes, more particularly hydrogenated sperm oil and refined derivatives therefrom, may be reacted with a phosphorus sulfide to obtain much higher yields of the reaction product than can be obtained from the naturally occurring corresponding unhydrogenated wax, and that in addition the reaction product as well as the metal compounds thereof have improved properties with respect to the inhibition of acid and sludge formation. Both the reaction product and the metal compounds thereof are suitable for lubricating uses and as additives to lubricating oils and greases.

The invention is applicable to any naturally occurring unsaturated wax which has been hydrogenated, or derivative therefrom, such as hydrogenated degras and hydrogenated sperm oil and various purified derivatives thereof. The extent of the hydrogenation should be substantial if the advantages of the invention are to be obtained; in general the amount of hydrogenation should be at least sufficient to reduce the iodine value to half of the value of the unhydrogenated wax. For example, sperm oil has an iodine value of about 80 and it is preferable that its iodine value be reduced to at least 40, and preferably to less than 20, such as in the neighborhood of 3 to 10. The iodine value of the degras varies somewhat, depending upon its source, but is generally within the range of 20 to 30; it is desirable to reduce its value to 10 to 15, preferably 5 or less. Generally the best results are obtained by selecting a wax for hydrogenation which has an iodine value of at least 20.

The naturally occurring unsaturated waxes, which are hydrogenated in accordance with the invention, are generally in the form of higher fatty acid esters of higher molecular weight mono-atomic alcohols as the major ingredient. The unsaturation may be in the alcohol or acid part of the ester or both. Other ingredients may be contained in the wax including a certain amount of free alcohols, glycerides, etc. which may be unsaturated. Their composition is well understood in the art. By hydrogenating these naturally occurring unsaturated waxes, greatly improved yields of the reaction product are obtained, and the additive formed has superior properties.

In carrying out the reaction between the hydrogenated wax and the phosphorus sulfide, the proportions may be selected and the temperature conditions adjusted so as to obtain a reaction product containing a substantial amount of sulfur and a relatively smaller amount of oxygen and phosphorus. This is the preferred embodiment of the reaction product and it may be used as such or converted into a metal compound. If these conditions do not obtain, the reaction product is or may contain a major amount of a thiophosphate.

If a sludge or residue is formed, and this is the case in the preferred embodiment mentioned, the reaction product is separated from this residue which contains oxygen and phosphorus, probably in the form of an oxide of phosphorus, or a phosphate, along with other materials. In the preferred embodiment, the reaction indicated by the observed facts appears to be one in which at least a part of sulfur replaces oxygen in the hydrogenated wax and at least part of the displaced oxygen combines with the phosphorus to form a phosphorus and oxygen-containing compound, which separates with the residue. When the conditions are such as to form a thiophosphate, the phosphorus content of the sulfide, or at least a part of it, is combined with the hydrogenated wax and under such reaction conditions, there is less of a tendency for the formation of a sludge or residue. The amount of phosphorus and oxygen in the reaction product will be those corresponding to the thiophosphate of the hydrogenated wax involved.

The reaction product of the phosphorus sulfide and the hydrogenated wax may be used as such, or it may be reacted with the basic compound, either organic, such as an amine, or of a metallic nature, such as metal oxide of hydroxide, to form the corresponding salt or soap thereof.

In accordance with the preferred embodiment of the invention, the reaction between the hydrogenated wax and the phosphorus sulfide should be carried out at a temperature above the temperature at which thiophosphates would be formed, so that a minimum of the phosphorus enters into chemical combination in the reaction product and the composition is substantially free or has a minimum of thiophosphates. Also, a minimum of oxygen remains in the reaction product or at least a smaller amount than in the case of thiophosphates, since the phosphorus eliminates at least part of the oxygen in the form of a phosphorus and oxygen-containing residue.

The temperature to be used may vary somewhat, depending upon the molecular weight of the hydrogenated wax and the rate of the reaction desired. The temperature limits in any case may be determined readily by an analysis of the reaction product; if it is a thiophosphate, the temperature that has been employed for the particular hydrogenated wax involved is too low to make the preferred reaction product. In view of the many variables involved, it is difficult to assign a temperature in numerical terms that is optimum for all hydrogenated waxes but in general the temperature should be above 270° F., generally about 275° to 325° F. and preferably around 290 to 310° F. Temperatures in excess of 350° to 400° F. are not required in order that the reaction may proceed at a desired rapid rate. There is no point in using a higher temperature than will cause the reaction to proceed smoothly. The reaction is exothermic and for this reason the phosphorus pentasulfide is added at a rate such that the temperature does not rise excessively and does not exceed that specified above.

The amount of the phosphorus sulfide to be used in making the reaction product in accordance with the preferred embodiment of the invention preferably should be at least equivalent to the theoretical amount required to replace the oxygen in the hydrogenated wax. The amount of the sulfide will vary with the molecular weight and purity of the hydrogenated wax, but no difficulty is involved in making the simple chemical calculations. For example, if a purified fully hydrogenated sperm oil is regarded as pure cetyl palmitate, the amount of phosphorus sulfide would be 18.5% of the hydrogenated sperm oil. In general the amount will range from 15 to 30% and in the case of most hydrogenated waxes from 18 to 25%. A small excess over the theoretical amount of the sulfide, for example not substantially over 10 to 15%, may be of assistance in forcing the reaction to completion. The excess preferably should not be too great since a part of the excess may remain dissolved in the reaction product and increase the sulfur and phosphorus content thereof in the molal ratio in which they exist with the phosphorus sulfide.

The phosphorus sulfide to be used preferably is phosphorus pentasulfide, since this is readily available and is an economically desirable raw material. Any other phosphorus sulfide, however, may be used, for example, phosphorus sesquisulfide.

When the preferred embodiment of the invention is practiced it is practical, on a commercial scale, to form the reaction product with not over 2% oxygen and 2% phosphorus. The amount of sulfur may be as high as 8 to 15% depending on the nature of the hydrogenated wax. At least some of any of the phosphorus which remains in the reaction product may be entrained rather than in chemical combination, and at any event, said phosphorus is not viewed as essential to the properties of the final product, as shown by the fact that the reaction product may be washed and part of the phosphorus removed by the washing, without interfering with the desirable properties of the reaction product.

After the reaction between the phosphorus sulfide and the hydrogenated wax is completed, any phosphorus and oxygen-containing by-product residue will settle out upon standing together with other insoluble materials, and the reaction product may be separated, such as by decanting, or the reaction product may be separated by centrifuging and by filtering.

If desired, the hydrogenated wax may be mixed with a mineral lubricating oil in order to facilitate the reaction and improve the yield. However, because of the enhanced yields attained by use of the hydrogenated wax as a raw material, it is not so essential that this be done.

Also, if desired, the total amount of phosphorus sulfide to be used may be divided into two or more portions. After the first portion is added, the reaction mixture may be neutralized before the remainder of the phosphorus sulfide is added, as described in my application Serial No. 546,565, filed July 25, 1944, now Patent No. 2,441,587. This procedure is thought to neutralize the acidity of the residue and improve the yield of the product.

The following examples are included as illustrative, but without limiting the scope of the invention as otherwise described and claimed herein.

*Example I*

Hydrogenated sperm oil is reacted with 20% phosphorus sulfide at a temperature of about 300° F. This hydrogenated sperm oil has an iodine value of 6–7, a melting point of 50–52° C., a free fatty acid content (as oleic) of 1.0–2.0%, a saponification value of 135–138, and about 36% of unsaponifiables. This hydrogenated sperm oil is available under the trade-name of "Spermofol No. 52." After the reaction is complete, which under the reaction conditions takes 4 hours, the material was permitted to stand, after which the by-product residue settles and the reaction product was decanted; following this, it is filtered with the use of a filter aid and is suitable for use as such as a lubricant, or it may be added to a lubricating oil in amounts such that the reaction product is present in an amount of 0.1 to 15%, preferably 2 to 6%. The yield of the reaction product based upon hydrogenated sperm oil raw material is 100%.

*Example II*

A refined hydrogenated sperm oil, which is made by treating hydrogenated sperm oil to remove a portion of the glycerides therefrom, was reacted with phosphorus pentasulfide. The refined hydrogenated sperm oil has an iodine value of 6.0, a melting point of 48–50° C., a free fatty acid content (as oleic) of 0.4%, a saponification value of 125, and 45% of unsaponifiables. This refined hydrogenated sperm oil is available under the trade-name of "Cosmol #1000." This refined hydrogenated sperm oil is reacted under the same conditions as that described in Example I, and the yield of the reaction product, based on the refined hydrogenated sperm oil is 100%.

The yields, in accordance with the above two examples, are greatly improved as compared with naturally occurring sperm oil reacted under identical conditions, as will be seen from the following table:

| Base Material Reacted | Sperm Oil | Hydrogenated Sperm Oil | Refined Hydrogenated Sperm Oil |
|---|---|---|---|
| Amount of $P_2S_5$ _____ per cent__ | 20 | 20 | 20 |
| Reaction temp _____ °F__ | 300 | 300 | 300 |
| Reaction time _____ hours__ | 4 | 4 | 4 |
| Yield based on raw material per cent__ | 70 | 100 | 100 |

In order to demonstrate the properties of the reaction products in improving the properties of lubricating oil, and to compare the reaction products in accordance with the invention with that made from naturally occurring sperm oil, the additive was incorporated in a lubricating oil in the amount of 4.5% based upon the total composition. The lubricating oil comprised 74.5% of a Mid-Continent S. A. E. 30 lubricating oil and 21% Mid-Continent Bright Stock. The lubricating oils containing these additives were tested in an Ethyl Motor Operation, under "Procedure IV," in which the operating conditions are as follows:

Type of motor _____ Ethyl Motor Series 30
Engine speed _____ 1200 R. P. M.
Sump temperature _____ 300° F.
Jacket temperature _____ 212° F.
Air fuel ratio _____ 15:1
Compression ratio _____ 7:1
Catalyst _____ 0.10% $Fe_2O_3$—as iron naphthenate The results are as follows:

| Additive | Blank | Sperm Oil | Hydrogenated Sperm Oil | Refined Hydrogenated Sperm Oil |
|---|---|---|---|---|
| Oil Blending: | | | | |
| Mid-Continent S. A. E. 30 Lubricating Oil_per cent__ | 79 | 74.5 | 74.5 | 74.5 |
| Mid-Continent Bright Stock per cent__ | 21 | 21 | 21 | 21 |
| Amount of Additive per cent__ | None | 4.5 | 4.5 | 4.5 |
| Ethyl Motor Operation Procedure IV: | | | | |
| Length of Run hours__ | 10 (only) | 20 | 20 | 20 |
| Sludge _____ per cent__ | 4.5 | 5.0 | 0.4 | 0.8 |
| Acid No _____ | 4.0 | 2.2 | 3.0 | 2.5 |
| Viscosity Increase ____ | 385 | 232 | 83 | 119 |
| Skirt No _____ | 3.0 | 0.0 | 0.0 | 0.0 |
| Demerit Rating _____ | 15.4 | 9.5 | 4.2 | 4.5 |

In considering the above data it is important to note that in the blank, i. e., the oil not containing the additive, the run is for only 10 hours. It cannot be continued longer with safety, because the rings stick and the operation must be stopped unless the motor is to be injured. In the runs of the oil containing the additives, the run is for 20 hours although the operation could be continued longer. It is stopped after 20 hours, since this is sufficient time in which to evaluate and compare the effect of the various additives.

While the additive made from sperm oil in accordance with my Patent No. 2,331,923 greatly improves the oil, as shown by a decrease in the demerit rating of 15.4 in a 10 hour run to 9.5 in a 20 hour run, the additives made in accordance with my invention here disclosed, utilizing hydrogenated sperm oil or a refined hydrogenated sperm oil as illustrative examples, are greatly superior, particularly in reducing the amount of sludge formed.

Any of the above sulfide-hydrogenated wax reaction products may be converted into the salt or soap thereof by treatment with any basic compound. This compound may be of an organic nature, such as an amine, an alkylolamine, pyridine, or other compounds recognized in the general class of organic bases. A basic metal compound may be used, such as an oxide or hydroxide. These metals may be an alkali metal, such as sodium, potassium and lithium, or an alkaline earth metal, such as calcium, barium, magnesium or strontium. The metal also may be aluminum or lower than aluminum in the electromotive series, such as chromium, cadmium, cobalt, antimony, bismuth, arsenic, mercury, etc. The metal should be selected with reference to the use of the composition and the properties desired in it. For example, metals which are known to have prooxygenic effects under certain conditions may be used in making additives for gear box greases but preferably not in making additives where oxidation conditions are severe. The alkali metals have excellent emulsifying characteristics. The alkaline earth metals have excellent detergent characteristics with a minimum of emulsification. The heavier metals have surface corrosion inhibition characteristics.

The amount of the basic compound to be employed will depend largely on the molecular weight of the basic compound and the saponification value of the reaction product. The pH value of the reaction product will be within the range of 2 to 6, whereas the fully neutralized or saponified product is above 7, depending on the alkalinity of the base used. The amount of the base employed should be such that the acidity is materially reduced in the reaction product. The amount of the basic compound will vary from about 1 to 15%, depending upon the factors mentioned.

The amount of the metal compound also will depend on whether the reaction product is to be completely or partially saponified or neutralized. If desired, the amount of the basic compound may be such as only to saponify partially the reaction product so as to form a mixture of the unsaponified reaction product and the metal compound thereof. Such a mixture is advantageous under some circumstances, since it embodies the peptizing, detergent, or inhibiting features of the saponified product together with the maintenance of the clean surfaces which may be attributed, at least in part, to the presence of polar groups in the unsaponified portion.

The sulfide-hydrogenated wax reaction product may also be treated with the plurality of metals, for example, sodium and calcium, calcium and barium, sodium and arsenic and calcium and bismuth are desirable combinations. A mixture of two or more metals also may be used when the reaction product is only to be partly saponified. I am not certain if both of the metals become chemically combined in a single molecule or if the new composition or additive comprises a mixture in which the two metals are each in different molecules. However, I intend either possibility to be covered and included within my description of the plural metal compound of the reaction product.

In the case of certain higher metals, the oxides or hydroxides of which are not very reactive, the reaction product may be converted into an alkali metal saponification product and this may then be reacted with the salt of a higher metal to replace the alkali metal to form the desired heavier metal compound. If desired, only a part of the alkali metal may be replaced by the heavier metal and in this way the mixture of alkali metal and heavier metal may be formed.

In making any of the basic or saponified compounds, the sulfide-hydrogenated wax reaction product, preferably after it is separated from the residue, is heated to a temperature of about 180° to 212° F. and the basic compound added. The reaction proceeds better if water is present so that the temperature preferably is maintained at not over 212° F. unless pressure is used. If the saponification is carried out at a higher temperature under pressure, for example, in a closed vessel in the presence of water and at a temperature to produce a pressure of about 50 pounds per square inch, the reaction time may be reduced considerably.

The reaction is continued until the acidity is reduced to the desired point or until the ash content is raised to the desired level. After the reaction, which may proceed from 1 to 8 hours, the product is heated above 212° F., such as about 250° F. to drive off any water. The mixture is then settled and the metal compound reaction product is separated from any unreacted basic or metal compound and filtered. If the initial reaction product is to be converted into a saponified reaction product it is not necessary to filter the initial reaction product before reacting it with the basic compound, but it is preferred to separate the reaction product from any sludge such as by settling and decanting.

The amount of the above described basic or metal compound of the sulfide-hydrogenated wax reaction product to be added to an oil or grease, if it is not used as a lubricant in its undiluted form would depend upon the characteristics of the oil or grease and the intended use. Some oils have more of a tendency to form acid and sludge than others, and such oils require larger quantities of the addition agent. Also oils that are intended for higher temperatures require larger amounts of the additive. In general, the range is from 1 to 15%, but under some circumstances amounts as low as 0.01% show a remarkable improvement. Since the addition agent is a lubricant itself, there is no upper limit to the amount that may be added to an oil. It is uneconomic, however, to add more than is necessary to impart to the oil the desired properties.

As illustrative of the preparation of the metal salts or soaps of the sulfide-hydrogenated wax reaction products, the reaction product prepared in accordance with Example II was saponified with 2% lime hydrate and 12% barium hydrate by weight, based on the reaction product. Saponification is carried out at a temperature of about 175 to 200° F. by agitating the reaction product with the above named hydrates for about 4 hours. Following this the temperature is raised to about 212° F. to dry out the product. Preferably the lime and barium hydrates are added slowly so as not to cause undue heat generation which results in foaming and the loss of water due to the temperature rise.

The lime-barium salt of the reaction product was added to a Mid-Continent S. A. E. 30 lubricating oil in an amount of 6% by volume. The lubricating oil containing this additive was tested in an Ethyl Motor Operation under "Procedure V" which utilizes conditions different than Procedure IV. These different conditions are particularly adapted to demonstrate the detergent effect of the metal salt of the additive, and are as follows:

Type of motor _____ Ethyl Motor Series 30
Engine speed _____ 1200 R. P. M.
Sump temperature _____ 225° F.
Jacket temperature _____ 350° F.
Air fuel ratio _____ 15:1
Compression ratio _____ 7:1

The results of the test of the oil containing this additive as compared with a blank, i. e., an oil not containing an additive, are shown in the following table:

|  | Blank, 40 hrs. | With Additive, 40 hrs. | With Additive, 80 hrs. |
|---|---|---|---|
| Sludge_____per cent__ | 0.35 | 0.15 | 0.20 |
| Acid No._____ | 0.75 | 1.0 | 1.20 |
| Viscosity Increase_____ | 390 | 66 | 97 |
| Skirt No._____ | 4.0 | 0.0 | 0.0 |
| Demerit Rating_____ | 9.0 | 1.8 | 2.4 |

As further illustrative of the action of the metal soaps or salts of the reaction products, the sodium salt of each of the reaction products of Examples I and II were prepared, as well as the sodium salt of the reaction product of sperm oil which was prepared for comparative purposes. The sodium compounds were made by reacting the additive with 4% of sodium hydroxide and 50% of water based on the additive for a period of about 4 hours at a temperature of 212° F. These additives were then tested in an Ethyl Motor Operation under "Procedure V." The results are tabulated in the following table:

| Base Material for Reaction Product | None | Sperm Oil | Hydrogenated Sperm Oil | Refined Hydrogenated Sperm Oil |
|---|---|---|---|---|
| Amount of $P_2S_5$__per cent__ |  | 20 | 20 | 20 |
| Reaction Temp_____° F__ |  | 300 | 300 | 300 |
| Reaction Time_____hours__ |  | 4 | 4 | 4 |
| Manufacture of Metal Soap: |  |  |  |  |
|   Alkali used_____ |  | NaOH | NaOH | NaOH |
|   Amt. of Alkali by wgt. per cent__ |  | 4 | 4 | 4 |
|   Amt. of Water by wgt. per cent__ |  | 50 | 50 | 50 |
|   Saponification Temperature_____° F__ |  | 212 | 212 | 212 |
|   Saponification Time hours__ |  | 4 | 4 | 4 |
| Oil Blending: |  |  |  |  |
|   Amt. of Mid-Continent S. A. E. 30 Lubricating Oil per cent__ | 79 | 74.5 | 74.5 | 74.5 |
|   Amt. of Mid-Continent Bright Stock per cent__ | 21 | 21 | 21 | 21 |
|   Additive_____do____ | None | 4.5 | 4.5 | 4.5 |
| Ethyl Motor Operation Procedure V: |  |  |  |  |
|   Length of Run_hours__ | 40 (only) | 100 | 100 | 100 |
|   Amount of Sludge_____ | 0.35 | 1.00 | 0.25 | 0.20 |
|   Acid No._____ | 0.75 | 1.50 | 1.00 | 0.87 |
|   Viscosity Increase_____ | 390 | 550 | 319 | 264 |
|   Skirt No._____ | 4.0 | 0.0 | 0.0 | 0.0 |
|   Demerit_____ | 9.0 | 8.0 | 4.45 | 3.71 |

In considering the above data, it is important to note that the run on the blank, i. e., the oil not containing the additive, was only 40 hours, since to continue this run longer would result in the sticking of the rings and injuring the motor. In the runs of the oil containing the additive, the operation was continued for 100 hours, and could be continued for much longer, although this length is sufficient for comparative purposes. Comparing the results with the blank, it is important to keep in mind this difference in run, since 0.25% sludge in a 100 hour operation indicates an additive vastly superior to one resulting in 0.35% sludge in a 40 hour run. Similarly, a demerit of 8.0 in a 100 hour operation indicates a greatly superior oil to one having a demerit of 9 in a 40 hour operation.

In addition to rendering the lubricating oil more resistant to oxidation and improving its detergent qualities, these additives as described possess desirable extreme pressure qualities. Thus the addition to a lubricating oil of from 1% to 6% of the reaction products greatly improves the oil as tested, both by the Cornell test and Timken test as run under prescribed conditions. The straight reaction products appear to have somewhat superior E. P. properties over the metal soaps but this is not meant to imply that the metal soaps lack this property, because the metal soaps also possess this property and the degree to which it is retained appears to be a function of the type of metal used and degree of saponification. The use of these sulfide-hydrogenated wax reaction products and soaps made therefrom are more satisfactory in general than those normally used, and containing active chlorine, in that corrosion at higher temperatures is greatly reduced and the body of the oil remains more stable due to the inhibiting nature of the additive.

In certain cases, depending on the type of hydrogenated wax and type of metal used and degree of saponification attained, these reaction products have a great effect on the cold test of the mineral oil to which they are added. Thus the barium soap of the reaction product of refined hydrogenated sperm oil and $P_2S_5$ has a pronounced effect on the cold test of an S. A. E. 20 motor oil, lowering it perceptibly.

It will be obvious to one skilled in the art that a variety of materials fall within the hydrogenated waxes defined generically herein and illustrated by the examples, and that various processing procedures may be adopted in making the new composition which will result in a variety of compositions within the generic type described herein as constituting the invention. All of the same as fall within the scope of the following claims are intended to be included within the invention.

I claim:

1. As a composition of matter suitable for use as a lubricant and as an addition agent to improve the characteristics of lubricating oils and greases, the reaction product of hydrogenated sperm oil hydrogenated to an iodine value of not over 40 with about 15 to 25% phosphorus pentasulfide, reacted at a temperature within the range of about 275 to 400° F. to form said reaction product.

2. As a composition of matter suitable for use as a lubricant and as an addition agent to improve the characteristics of lubricating oils and greases, the reaction product of hydrogenated sperm oil hydrogenated to an iodine value of about 3 to 10 with about 20% phosphorus pentasulfide reacted at a temperature within the range of about 290 to 325° F. to form said reaction product, and separated from a by-product residue.

3. As a composition of matter suitable for use as a lubricant and as an addition agent to improve the characteristics of lubricating oils and greases, the hereinafter named reaction product, at least a part of the acidity of which is neutralized with a basic compound, said reaction product being of 15 to 25% of a phosphorus sulfide with hydrogenated sperm oil hydrogenated to an iodine value of not over 40, reacted at a temperature within the range of about 270 to 400° F. to form said reaction product.

4. As a composition of matter suitable for use as a lubricant and as an addition agent to improve the characteristics of lubricating oils and greases, a metal compound of the reaction product of hydrogenated sperm oil hydrogenated to an iodine value of not over 40 with about 15 to 25% phosphorus pentasulfide reacted at a temperature within the range of about 270 to 400° F. to form said reaction product.

5. As a composition of matter suitable for use as a lubricant and as an addition agent to improve the characteristics of lubricating oils and greases, an alkaline earth metal compound of the reaction product of 15 to 25% phosphorus pentasulfide with hydrogenated sperm oil hydrogenated to an iodine value of not over 40, reacted at a temperature within the range of about 270 to 400° F. to form said reaction product.

6. As a composition of matter suitable for use as a lubricant and as an addition agent to improve the characteristics of lubricating oils and greases, the lime and barium compound of the reaction product of hydrogenated sperm oil hydrogenated to an iodine value of about 3 to 10 with 15 to 25% phosphorus pentasulfide reacted at a temperature within the range of 275 to 400° F. to form said reaction product.

7. Mineral lubricating oils and greases, suitable for lubricating moving metal surfaces, containing at least 0.01% of the reaction product defined in claim 1, said amount being sufficient to inhibit the oxidative deterioration of oil.

8. Mineral lubricating oils and greases, suitable for lubricating moving metal surfaces, containing at least 0.01% of the reaction product defined in claim 2, said amount being sufficient to inhibit the oxidative deterioration of oil.

9. Mineral lubricating oils and greases, suitable for lubricating moving metal surfaces, containing at least 0.01% of the reaction product defined in claim 3, said amount being sufficient to inhibit the oxidative deterioration of oil.

10. Mineral lubricating oils and greases, suitable for lubricating moving metal surfaces, containing at least 0.01% of the reaction product defined in claim 5, said amount being sufficient to inhibit the oxidative deterioration of oil.

11. Mineral lubricating oils and greases, suitable for lubricating moving metal surfaces, containing at least 0.01% of the reaction product defined in claim 6, said amount being sufficient to inhibit the oxidative deterioration of oil.

JOHN M. MUSSELMAN.

(References on following page)

REFERENCES CITED

The following references are of record in the file of this patent:

UNITED STATES PATENTS

| Number | Name | Date |
|---|---|---|
| 2,211,231 | Henderson | Aug. 13, 1940 |
| 2,316,085 | Kelso | Apr. 6, 1943 |
| 2,331,923 | Musselman | Oct. 19, 1943 |
| 2,347,592 | Cook | Apr. 25, 1944 |
| 2,357,346 | Musselman | Sept. 5, 1944 |
| 2,375,061 | Williams | May 1, 1945 |
| 2,381,127 | Kemp | Aug. 7, 1945 |
| 2,383,495 | Musselman | Aug. 28, 1945 |
| 2,385,832 | Musselman | Oct. 2, 1945 |
| 2,396,719 | Musselman | Mar. 19, 1946 |

OTHER REFERENCES

Lewkowitsch, "Oils, Fats and Waxes," 1914, vol. II, page 929.